A. DOW.
ELECTROGALVANIC GENERATOR.
APPLICATION FILED JAN. 5, 1912.
1,053,977.
Patented Feb. 25, 1913.
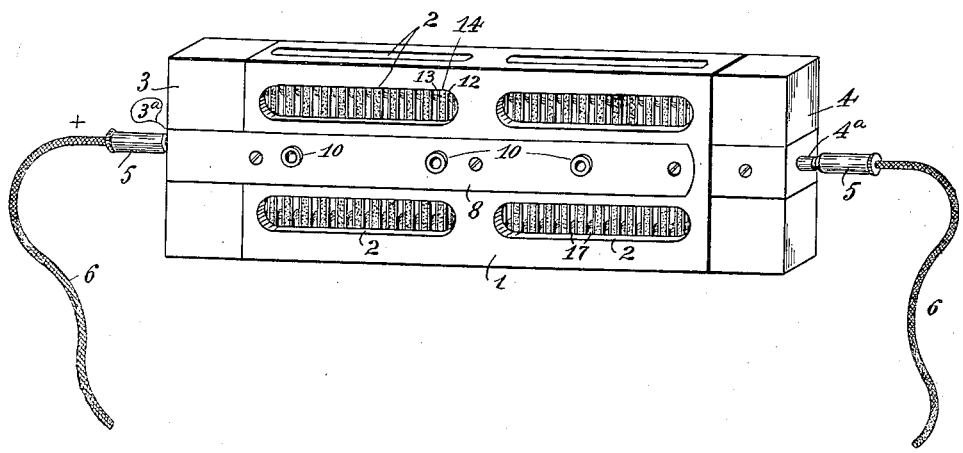
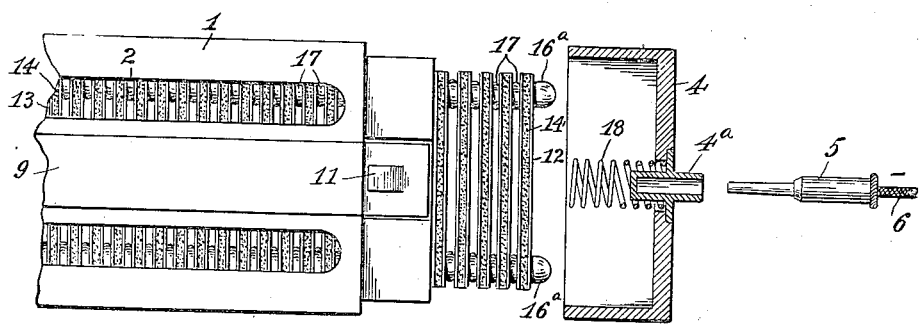
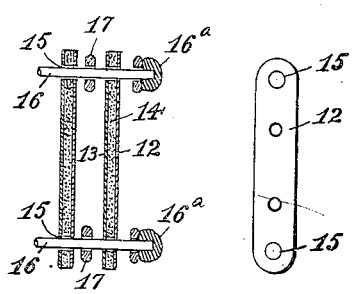
Inventor
Alonzo Dow
By Obed B. Billman
Attorney

UNITED STATES PATENT OFFICE.

ALONZO DOW, OF WOOSTER, OHIO, ASSIGNOR OF ONE-HALF TO CLARK C. ADAMS, OF WOOSTER, OHIO.

ELECTROGALVANIC GENERATOR.

1,053,977.  Specification of Letters Patent.  Patented Feb. 25, 1913.

Application filed January 5, 1912. Serial No. 669,555.

*To all whom it may concern:*

Be it known that I, ALONZO DOW, a citizen of the United States, residing at Wooster, in the county of Wayne and State of Ohio, have invented certain new and useful Improvements in Electrogalvanic Generators, of which the following is a specification.

My invention relates to improvements in electro-galvanic generators or batteries, the present embodiment being well adapted for electro-therapeutic apparatus for use in the electro-therapeutic diffusion or spread of electric currents throughout the different portions of the human body lying between two electro-therapeutic electrodes in the treatment and cure of diseases.

The invention relates more particularly to that class of galvanic batteries or generators which are designed to operate through direct contact with the atmosphere and generate and diffuse an electric current wheresoever desired for use, as for example, throughout the body in the electro-therapeutic treatment of disease.

The primary object of the invention is to provide a generally improved battery or generator of this class of exceedingly simple, cheap, and efficient construction for the purposes above mentioned.

Referring to the drawings forming a part of this specification Figure 1, is a perspective view of the improved generator or battery. Fig. 2, an enlarged detail view of the opposite side of the casing showing the removable head removed the casing being reversed longitudinally from the position shown in Fig. 1, the series of battery cells being partially withdrawn from the battery casing for the purpose of clearer illustration of the parts. Fig. 3, a detail sectional view of some of the battery cells and connections, in a separated position for the purpose of clearer illustration of the parts. Fig. 4, an end view of one of the zinc or copper elements or electrodes of one of the battery cells.

Similar numerals of reference designate like parts throughout all the figures of the drawings.

The improved electro-galvanic generator or appliance comprises an open battery casing 1, of suitable material such as hard rubber or the like, said casing being preferably provided with slotted openings 2, for the free passage of the air into and through the battery cells hereinafter described, and provided with stationary and removable terminal heads or ends 3 and 4 respectively carrying contact members $3^a$ and $4^a$, said contact members, in the present instance, being in the form of socket members to receive the connecting pins 5, attached to the conduit or conducting cords 6.

The generator of battery casing, in the present instance, is provided on opposite sides with longitudinally extending metallic plates 8 and 9, the plate 8 and subjacent portion of the casing 1, being provided with a series of insulated openings 10, for the reception of one or more connecting pins 5, carried by the cords 6, as hereinafter explained, and the other plate 9, has a limited movement at one end and provided with a catch or beveled lug 11, for removably holding and securing the removable terminal head or end 4, in closed position by engagement within a similar shaped recess in the inner adjacent side of the latter.

The compound battery comprises a series of battery cells removably mounted within the generator or battery casing 1, each of said cells comprising a generating element or electrode 12, consisting of a zinc plate, and a positive element or conducting electrode 13, of copper, said zinc and copper electrodes 12, and 13 being separated from each other by a similarly shaped intermediate element 14, of absorbent material such as felt cloth, or the like.

The elements 12, 13, and 14, comprising the cells are provided near their ends with openings 15, for the reception of insulated cords 16, such as paraffined cord or the like, said cell members being held in regularly spaced relation to each other and connected in circuit through the medium of suitable metallic conducting member 17, in the present instance, in the form of eyelets or rings of suitable conducting material such as copper or brass to provide for the cumulative effect of the cells by the transmission of the electric current derived from the chemical action in the battery cells as it is conducted from and through the negative and positive poles of the battery or generator. The end cells of the series are held out of contact with the heads or ends 3 and 4 by means of the insulated cord heads $16^a$ As a means for holding the series of battery cells in proper position within the casing 1, as well as insuring the contact at all times between the terminal battery cells and the contact members 3ª and 4ª as well as holding the various battery cells in operative contact with the metallic conducting ring members 17, the terminal head 4, has its contact member 4ª provided with a spring contact member 18, in the present instance, in the form of a coiled spring adapted to contact with the adjacent end battery cell in making the electro-magnetic connection, said spring member being adapted to be compressed as the removable head member 4, is moved into position, and held under compression when the latter is latched and held in its closed position through the medium of the catch member 11, carried by the movable free end of the metallic plate 9.

When it is desired to decrease or reduce the cumulative effect of the battery cells and consequently the strength of the electric current, one of the connecting pins 5, of one of the conducting cords 6, may be inserted in one of the insulated openings 10, and downwardly between two of the subjacent battery cells in accordance with the requirements in the particular case.

From the foregoing description, taken in connection with the accompanying drawings, the operation and advantages of my invention will be readily understood.

Having thus described one of the embodiments of my invention, what I claim and desire to secure by Letters Patent is,—

1. In an electro-galvanic generator, an open casing provided with terminal heads one of which is removable, a series of battery cells, insulated flexible members extending through said cells, conducting ring members mounted on said insulated flexible members intermediate said battery cells, and means carried by said removable terminal head for holding said cells and ring members in circuit with said terminal heads when said removable head is closed.

2. An electro-galvanic generator, comprising an open casing provided with terminal heads and longitudinally extending metallic side plates one of which is provided with insulated plug openings, a series of battery cells mounted in said casing between said heads and communicating with said plug openings, connecting pins adapted to be inserted in said plug openings and between adjacent battery cells, and a spring contact member carried by one of said heads and adapted to hold said cells in circuit with said heads.

3. In an electro-galvanic generator, an open battery casing provided with a stationary terminal head and contact member, a series of battery cells removably mounted therein and connected to each other by means of insulated cord members and conducting ring members mounted on said cord members between said cells, and a removable head member provided with a spring contact adapted to hold said cells and contact members in operative relation to each other.

4. An electro-galvanic generator, comprising an open casing provided at opposite ends with suitable terminal heads, one of which is removable and provided with a spring contact member, a series of battery cells removably mounted in said casing between said terminal heads, insulated cord members extending through said battery cells and provided with conducting ring members interposed between said cells, and means for securing said removable terminal head in closed position, whereby said cells and ring members are held in circuit with said heads by the tension of said spring contact member.

5. In an electro-galvanic generator, a casing provided with a stationary terminal head and contact member and metallic side plates one of which is provided with intermediate plug openings and the other of which terminates in a movable catch, a series of battery cells, insulated flexible members extending through said battery cells, metallic conduit members movably mounted on said insulated flexible members and interposed between said battery cells, and a removable head or end member adapted to be engaged by said movable catch and provided with a spring contact member adapted to hold said battery cells and conducting members in circuit with said stationary contact member.

In testimony whereof I have affixed my signature in presence of two witnesses.

ALONZO DOW.

Witnesses:
Thomas A. Elder,
J. A. Craig.